Oct. 18, 1932.  S. CARVOUR  1,883,551
MOP WRINGING APPARATUS
Filed Aug. 11, 1930   2 Sheets-Sheet 1
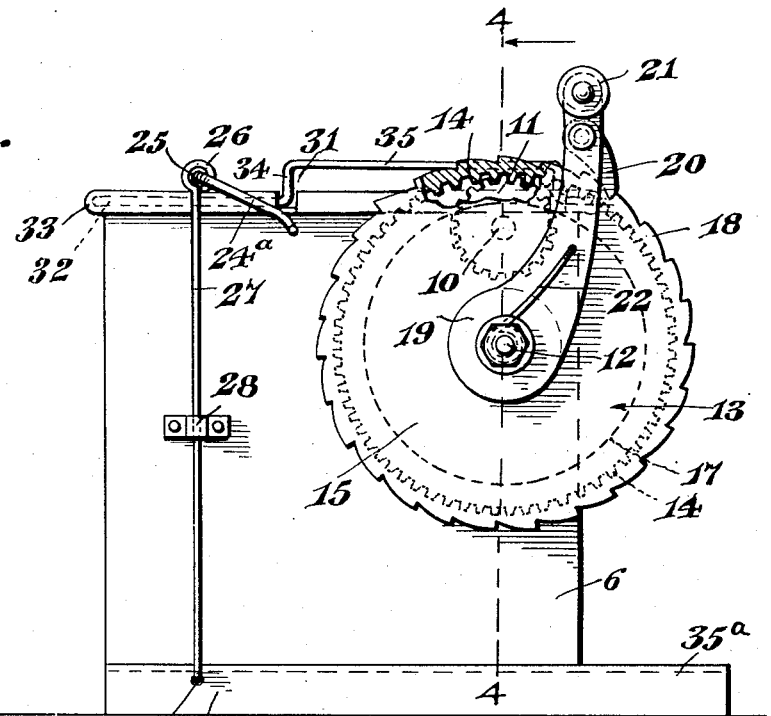
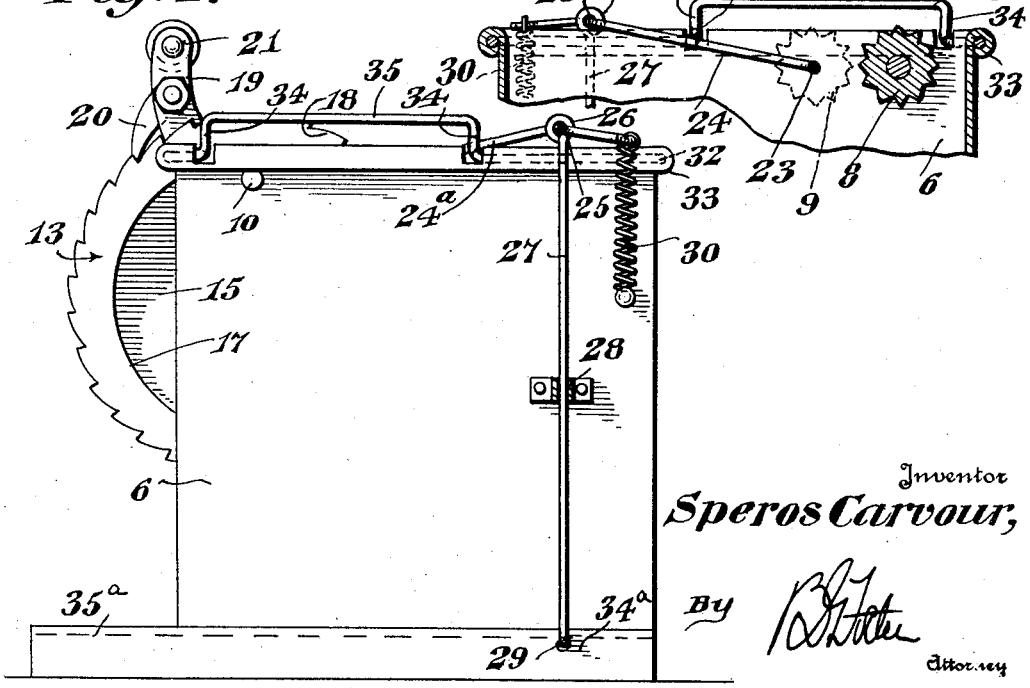
Inventor
Speros Carvour,
By
Attorney

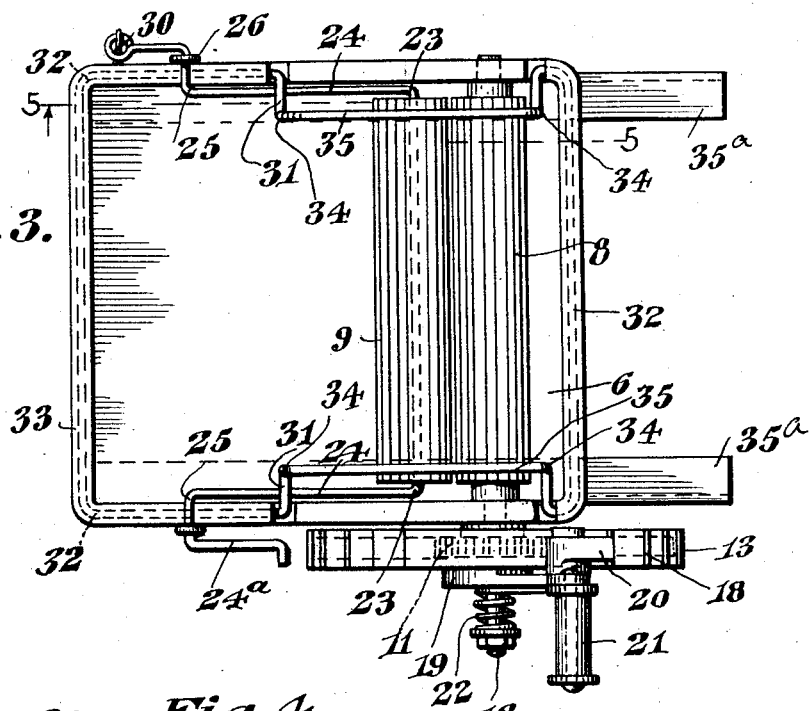
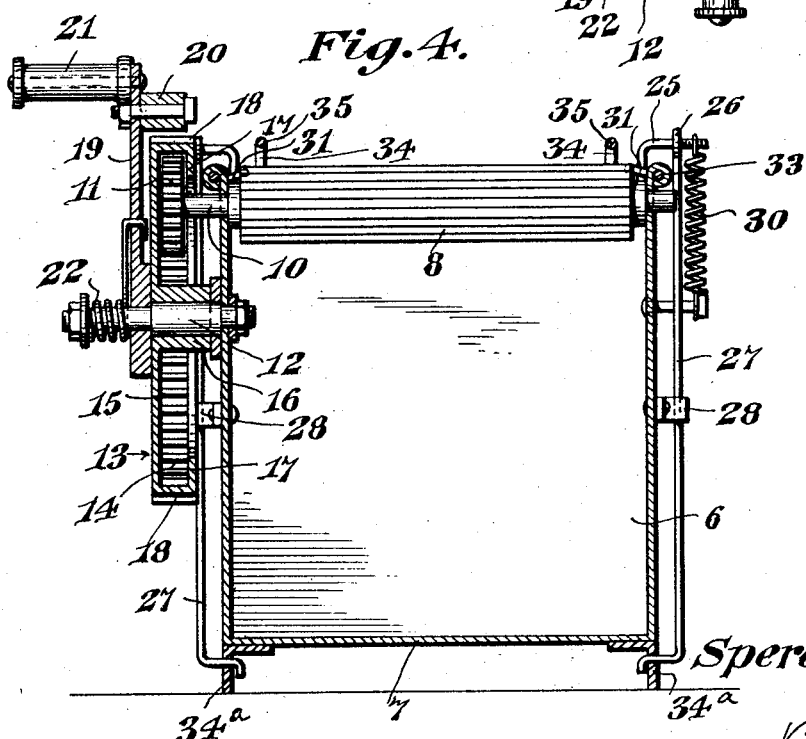

Patented Oct. 18, 1932

1,883,551

UNITED STATES PATENT OFFICE

SPEROS CARVOUR, OF JERSEY CITY, NEW JERSEY

MOP-WRINGING APPARATUS

Application filed August 11, 1930. Serial No. 474,531.

The object of the present invention is to provide a simple and effective wringing mechanism that will relieve the operator of the usual strain incident to pulling the mop upwardly—an operation which incidentally is inconvenient to perform under ordinary circumstances.

In the accompanying drawings:

Figure 1 is a side elevation of the preferred embodiment of the invention, a portion being shown in section.

Figure 2 is a similar view of the opposite side.

Figure 3 is a top plan view.

Figure 4 is a sectional view on the line 4—4 of Figure 1.

Figure 5 is a sectional view on the line 5—5 of Figure 3.

In the form of construction shown, a container for the cleansing fluid is employed that is preferably rectangular in cross section, being provided with upright side walls 6 and a bottom 7. A pair of wringer rolls 8 and 9 are employed that are preferably of longitudinally ribbed formation and may be of metal or other material.

One of these rolls 8 is positively rotated, and to this end it is mounted on a shaft 10 carrying a gear wheel 11 that is located on the outer side of the container. A stub shaft or spindle 12, fixed to the side of the container, has journaled thereon a driving member 13 which includes an internal gear 14 surrounding and in mesh with the gear wheel 11. The outer wall 15 of this driving member carries a hub 16 journaled on the spindle 12 and the gear is preferably provided with an inturned flange 17 located at the inner side of the gear wheel 11, and serving to prevent any displacement between the gears.

The periphery of the driving member 13 is formed with ratchet teeth 18, and journaled on the outer or free end portion of the spindle 12, is a crank arm 19 carrying a suitable pawl 20 that meshes with the teeth 18. This pawl may be of any desired character. The crank arm 19 has an oscillatory movement, and is provided at its free end with an outstanding treadle 21. A spring 22, mounted on the spindle 12 and operating on the crank arm 19, serves to return said arm after its operation.

The roller 9 that cooperates with the roller 8 is journaled on the cross bar 23 of a yoke having side arms 24. This yoke swings downwardly into the container and is journaled by having the said side arms outturned, as shown at 25 to form pintles that are rotatably mounted in eyes 26 formed on the upper ends of spring rods 27.

The said rods are located vertically on the outer sides of the container, having their intermediate portions passing through clips 28 secured thereto, and their lower ends fixed at 29. One arm 24, which is shown on Figure 2, has its rear end connected to a spring 30 that serves to draw the yoke upwardly and cause the roller 9 to cooperate with the roller 8. The other arm 24, shown in Figure 1 has its end 24a turned in the opposite direction, i. e., towards the mechanism, as shown in Figure 3, and serves as a foot piece to depress the roll 9 in order to insert the mop between the two rolls. The movement of the roller 9 toward and from the roller 8, due to the interposition of a mop and its varied thickness, is permitted by means of the spring rods 27. The upward movement of the yoke and consequently of the roller 9 is limited by inturned stop lugs 31. These may be formed by the inturned portions of the marginal rod or wire 32 that is located in the rim 33 of the container. This rod or wire at these lugs has upward turns 34 and then extends across and above the ends of the rollers forming guards 35 that prevent the mop becoming entangled in the bearings of the rolls.

In using the device the mop is placed between the rollers, the roller 9 easily swinging downward to permit its introduction by means of the foot piece. When it is desired to wring the mop, it is only necessary for the operator to place his foot upon the treadle 21 and press downwardly. The pawl 20, operating on the ratchet teeth 18, will turn the driving gear member, thereby rotating the pinion or gear wheel 11 in a direction to cause the side of the roller 8, which is adjacent the roller 9, to move upwardly, thereby drawing up the mop without the necessity of pulling on the same. As already indicated, the spring rods 27 permit the roller 9 to move away from and urge it toward the roller 8, so that all portions of the mop will also be properly pressed against by the rollers during this upward movement. The repeated operations of the treadle will cause the mop to be drawn upwardly only by the rollers, the gear ratio being such that but one or two movements of the treadle will ordinarily be necessary.

In order that the container may be moved about freely and also to prevent any danger of its overturning, it preferably has runners 34a secured to its lower side. These runners may be angle irons in which the lower ends of the rods 27 are engaged, and it will be noted that said runners extend, as illustrated at 35a, beyond the side of the container adjacent to which the operating mechanism is located. These runners therefore constitute sliders that permit the easy movement of the container over the floor from place to place and the extended portions serve to prevent any danger of the apparatus being overturned when operated.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. A wringer including wringer rolls, a gear on one roll, a rotatable driving member having internal gear teeth operating the roll gear and having peripheral ratchet teeth, and an oscillatory treadle having a pawl operating on the ratchet teeth.

2. A container that has angularly disposed side walls, a wringer roll journaled on the container, means for rotating said roll, a substantially U-shaped yoke having a cross bar, a second wringing roll journaled on the cross bar, spring arms on the container in which the side arms of the yoke are journaled, said arms urging the second roll into coaction with the first roll, and a spring operating on the yoke to normally hold the roll elevated but permit its being depressed.

3. A wringer comprising a container having a side wall, a wringer roll journaled on the container and having a gear, a rotatable driving member journaled on one side of the container and operating on the gear to rotate it, said driving member having ratchet teeth, and an oscillatory crank arm that projects beyond the side wall of the container and has a foot treadle on its projecting arm that is movable downwardly alongside said wall, and a pawl carried by said arm and operating on the ratchet teeth to turn the driving member when the foot treadle is depressed alongside said wall.

4. A wringer comprising a container having a side wall, a wringer roll journaled on the container and having a gear, a rotatable driving member journaled on one side of the container and having an internal gear operating on the gear of the wringer roll to rotate it, said driving member having a peripheral set of ratchet teeth, and an oscillatory crank arm that projects beyond the side wall of the container and has a foot treadle on its projecting arm that is movable downwardly alongside said wall, and a pawl carried by said arm and operating on the ratchet teeth to turn the driving member when the foot treadle is depressed alongside said wall.

In testimony whereof, I affix my signature.

SPEROS CARVOUR.